United States Patent
Hoppe et al.

(10) Patent No.: US 9,545,861 B2
(45) Date of Patent: Jan. 17, 2017

(54) METHOD AND DEVICE FOR PRODUCING A LOCKING DEVICE AND LOCKING DEVICE FOR A LONGITUDINAL ADJUSTMENT MECHANISM OF A VEHICLE SEAT

(75) Inventors: Jens Hoppe, Remscheid (DE); Axel Speck, Haan-Gruiten (DE); Daniel Urban, Düsseldorf (DE)

(73) Assignee: C. Rob. Hammerstein GmbH & Co. KG, Solingen (DE)

(*) Notice: Subject to any disclaimer, the term of this patent is extended or adjusted under 35 U.S.C. 154(b) by 714 days.

(21) Appl. No.: 13/879,568

(22) PCT Filed: Oct. 28, 2011

(86) PCT No.: PCT/EP2011/068997
§ 371 (c)(1),
(2), (4) Date: Dec. 31, 2013

(87) PCT Pub. No.: WO2012/072350
PCT Pub. Date: Jun. 7, 2012

(65) Prior Publication Data
US 2014/0331814 A1    Nov. 13, 2014

(30) Foreign Application Priority Data
Dec. 2, 2010 (DE) .................. 10 2010 053 044

(51) Int. Cl.
F16M 13/00 (2006.01)
B60N 2/44 (2006.01)
B60N 2/08 (2006.01)

(52) U.S. Cl.
CPC ............. B60N 2/442 (2013.01); B60N 2/0806 (2013.01); B60N 2/0875 (2013.01);
(Continued)

(58) Field of Classification Search
CPC ..... B60N 2/00; B60N 2/01516; B60N 2/0155; B60N 2/0232; B60N 2/067
See application file for complete search history.

(56) References Cited

U.S. PATENT DOCUMENTS 2,531,326 A * 11/1950 Di Paolo ............... B62D 17/00
                                                    403/161
4,189,957 A    2/1980 Gedig et al.
(Continued)

FOREIGN PATENT DOCUMENTS

DE    42 42 895 C1    11/1993
DE    29700866        3/1997
(Continued)

OTHER PUBLICATIONS

International Search Report mailed Mar. 2, 2012 International Application No. PCT/EP2011/068997 (4 pgs).

*Primary Examiner* — Amy Sterling
(74) *Attorney, Agent, or Firm* — Foley & Lardner LLP

(57) ABSTRACT

A method for producing a locking device of a longitudinal adjustment mechanism of a vehicle seat, includes producing a locking device having a plurality of round locking pins which can be latched into position independently of one another and can be unlatched together, at least one guide part and a notched strip, wherein the guide part is assigned to a seat rail and has guide bores for the locking pins. The notched strip is assigned to a floor rail. The locking pins have an upper actuating end and a lower engagement region interacting with the notched strip. The locking pins are lubricated during the production step or subsequently thereto. During and/or after the lubrication step, each individual locking pin is rotationally driven by a rotary drive unit.

11 Claims, 5 Drawing Sheets

Figure 1:
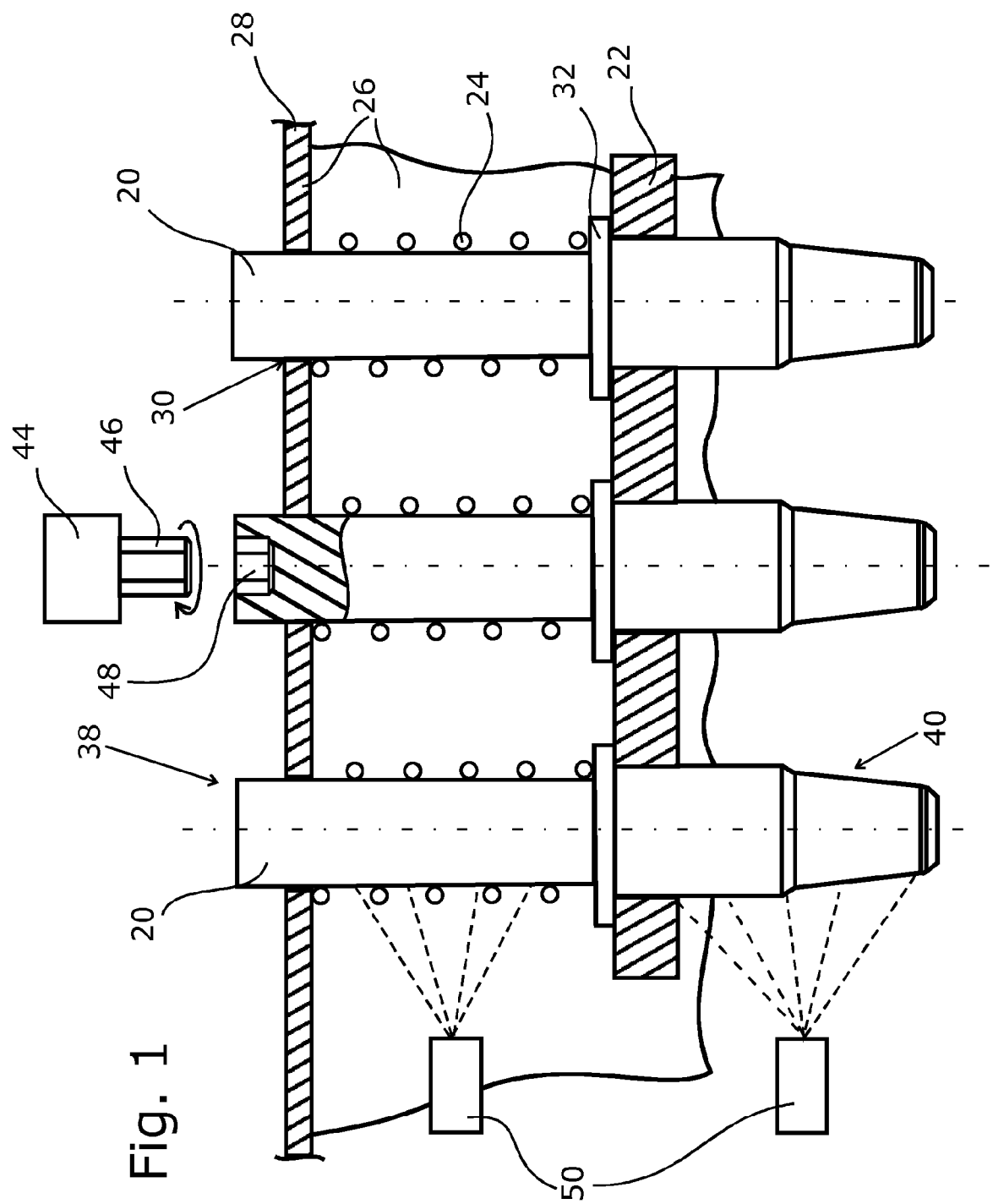

(52) U.S. Cl.
CPC . *B60N 2002/4455* (2013.01); *Y10T 29/49826* (2015.01); *Y10T 74/20636* (2015.01)

(56) References Cited

U.S. PATENT DOCUMENTS

| | | | | |
|---|---|---|---|---|
| 5,318,496 | A | * 6/1994 | Takahashi | B21D 28/12 483/1 |
| 5,906,539 | A | * 5/1999 | Tabel | B25H 1/02 248/188.2 |
| 5,941,495 | A | 8/1999 | Bauer et al. | |
| 6,059,248 | A | 5/2000 | Bauer et al. | |
| 6,637,712 | B1 | * 10/2003 | Lagerweij | B60N 2/0705 248/429 |
| 7,588,640 | B2 | * 9/2009 | Esser | C23C 14/505 118/500 |
| 2009/0111723 | A1 | * 4/2009 | Shibata | B23H 1/08 508/463 |

FOREIGN PATENT DOCUMENTS

| | | |
|---|---|---|
| DE | 29910720 | 8/1999 |
| DE | 202006004934 | 8/2007 |
| EP | 1 316 465 B1 | 1/2008 |
| GB | 2 355 399 | 4/2001 |

* cited by examiner

METHOD AND DEVICE FOR PRODUCING A LOCKING DEVICE AND LOCKING DEVICE FOR A LONGITUDINAL ADJUSTMENT MECHANISM OF A VEHICLE SEAT

CROSS REFERENCE TO RELATED APPLICATIONS

The present application is a National Stage of International Application No. PCT/EP2011/068997 filed on Oct. 28, 2011, which claims the benefit of German Patent Application No. 10 2010 053 044.1 filed on Dec. 2, 2010, the entire disclosures of which are incorporated herein by reference.

The invention relates to a method for producing a locking device of a longitudinal adjustment device of a vehicle seat, comprising the following steps: a) producing a locking device comprising several round locking pins that can be latched in independently of one another and unlatched together, at least one guide part and a notched strip, wherein the guide part is allocated to a seat rail and has guide bores for the locking pins, the notched strip is allocated to a floor rail, and the locking pins have an upper actuating end and a lower engagement region cooperating with the notched strip, and b) greasing the locking pins during the production step or subsequent thereto, as well as to a device for carrying out this method, and to a locking device in which the method can be applied.

Locking devices as they are known, for example, from EP 1 316 465 B1 are produced in accordance with this method. Other locking devices are known from U.S. Pat. No. 4,189,957 A, DE 29 700 866 U1, DE 299 10 720 U1, DE 42 42 895 C1 and GB 2 355 399 A. Associated rail pairs consisting of a seat rail and a floor rail are respectively known from several of these specifications; with regard to such rail pairs, additional reference is made to U.S. Pat. No. 5,941,495 A and U.S. Pat. No. 6,059,248 A. The rails are displaceable relative to one another in the known manner; they rest against each other via suitable guiding means. This longitudinal displacement is normally blocked by the locking device and unblocked upon actuation of the locking device.

According to the prior art, such locking devices are produced together with the rails as follows: First, the individual parts are produced. Then, the locking device is partially mounted in the seat rail. To this end, the guide part is connected to the seat rail; in this case, the locking pins are located in the guide part. The seat rail often has openings that are aligned with the guide bores of the guide part. The individual locking pins are located in these openings and in the guide bores. After the assembly of the guide part, the locking pins are trapped; they can no longer be removed individually. Each locking pin has its own spring biasing it into the latching position. Up until this state of the assembly, the floor rail is not yet connected to the seat rail. The locking pins are still accessible. Once the floor rail is connected to the seat rail, access to the locking pins is very limited. Therefore, the locking pins and/or the openings and the guide bores are greased prior to the attachment of the floor rail, and also, if possible, prior to the installation of the locking pins in the guide bores and the openings.

If the locking pins are greased prior to insertion into the associated opening and the associated guide bore, this grease cannot always be transported into the region where it is actually required. If the greasing process is carried out already in the inserted state of the locking pins, access to all surfaces of the locking pins is limited and not always possible. Greasing is necessary because locking pins that are difficult to move may induce faulty operation by a user, because noise may be produced and the actuating forces for the two locking devices of a longitudinal adjustment device of a vehicle seat, and also in comparison with the longitudinal adjustment devices of other vehicle seats, may be different. An actuating force which is within predetermined limits and a noise level that is as low as possible and also lies within predeterminable threshold values is desired.

This is where the invention comes in. It has set itself the object of improving the process of greasing locking pins and their guide parts, to carry it out more homogeneously, and thus improve, in particular minimize, the actuation behavior of the locking pins with regard to force and noise.

This object is accomplished by a method having the features of claim 1. As regards the device, it is accomplished by the device according to the features of claim 7. Finally, the object is accomplished by a locking device having the features of claim 10.

According to the invention, the locking pins are rotated during greasing and/or subsequent to greasing. They are rotated about their longitudinal axis. Since the locking pins are round, they can be rotated within the guide bore and the possibly provided opening. If the locking pins are rotated during greasing, this is advantageous in that the locking pins can be greased all around. If they are rotated after greasing, this is advantageous in that the grease is able to spread well within the guide portions, i.e. the guide bores and, if applicable, the openings.

A rotary movement is preferably introduced into the upper actuating end of the locking pin. In some locking devices, e.g. the one according to DE 42 42 895 C1, this protrudes upwards over the seat rail and can be gripped frictionally or positively. Preferably, the rotary movement is introduced positively. In a preferred embodiment, the upper actuating end has a non-circular portion for this purpose. The non-circular portion can be, for example, a non-circular cut-out in the form of a hexagon socket or the like, as it is known for screws. However, it can also be an external non-circular portion, such as it is known in hexagonal screw heads. The associated rotary drive unit comprises a rotating tool which, with regard to its shape, is adapted in complementary manner to the form of the non-circular portion. In the case of a hexagonal socket, the rotating tool is, for example, a pin with a hexagonal cross section.

In the case of locking pins and locking devices that are installed in such a way that the axial way to the actuating end is blocked, it is possible to form the actuating end as a gearing. The rotating tool of the rotary drive unit is then a correspondingly configured gear via which the rotation is introduced laterally.

The invention is advantageous in that, on the one hand, the actuating force of the locking device can be significantly reduced, and on the other hand, that the spread of the actuating force between individual locking devices can be kept remarkably small. The noise level is influenced positively. Noises which particularly occur shortly after the assembly, and in particular in brand-new vehicles, are significantly reduced.

It is advantageous if the locking pins of the locking device are all in the same position during greasing. For example, they can be in the completely pulled-up position. Preferably, the unlocking lid which is capable of unlocking all the locking pins of a locking device together, is not yet installed when the greasing process is carried out. An auxiliary tool can be used which pulls or pushes all the locking pins into the release position, i.e. has the same function as the actuated unlocking lid. However, it is also possible to leave all the pins in their lowermost position and to grease them in this state. All the pins can assume the lowermost position so long as no notched strip has been mounted yet. Since the greasing process is preferably carried out prior to the assembly of the floor rail and the floor rail is connected to the notched strip, this state can be reached without any accessories.

In a preferred development, it is proposed to additionally move the locking pins axially during the greasing process and/or subsequent thereto. For this purpose, a lift drive unit is also provided in addition to a rotary drive unit. This can be combined with the rotary drive unit and act on the actuating end.

The rotary drive unit and/or lift drive unit can also act on the engagement region. The lift drive unit can take over the task of the accessory just described. Preferably, the locking pins are greased over their entire length, at least over that partial area of their length that is accessible. This also includes the tapering lower end portion where the contact with the notched strip takes place. The notched strip itself is preferably not greased.

The grease used is a material which has adhesive properties that are as good as possible. An adhesive grease is being used. It is supposed to adhere as well as possible to the material of the locking pins as well as the guide bores and openings. The adhesion is supposed to lie in a range as provided today for so-called pressure-sensitive adhesives used on paper. Pressure-sensitive adhesives and contact adhesives are used as an additive to the grease. Polyisobutylenes, polyvinylethers, polyacrylethers and natural or synthetic rubbers are possible. In this case, the lubricating properties are supposed to be sufficient; at least, they are supposed to be as good as, preferably better than, the lubricants used so far according to the prior art.

The locking pins are rotated completely, preferably slightly more, at least once. The lifting device preferably has a stroke that corresponds to the subsequent working stroke of the locking pin. Common motors can be used as the rotary drive unit, for example electric motors with a reduction gear unit, drills and the like; however, hydraulic rotary drive units can also be used. In the case of locking pins without a non-circular portion, a rotating tool of the rotary drive unit is recommended which reaches over the actuating end or the engagement region of the locking pin. For example, it has the shape of a bowl or a cone. They can be made from an elastic material, for example hard rubber.

Preferably, the grease is sprayed onto the locking pins and the other components. For this purpose, a spraying device is provided which, if possible, is only directed to those regions in which an application is to take place. Other means that make an application over a surface possible can also be used instead of a spraying device. Thus, the lubricant can also be applied by means of a sponge, a rag, a brush or the like. A uniform, thin, full-surface application is the goal.

The locking device according to claim 10 is particularly suitable for the method according to the invention due to the fact that the locking pins comprise a non-circular portion and their rotation is introduced via a rotating tool that is applied axially or laterally and that transmits the rotary movement in a positive manner. In an alternative, it is also possible to provide the non-circular portion in areas of the locking pin other than the actuating end; for example, it can also be formed at the lowermost end of the engagement region.

Figure 2:
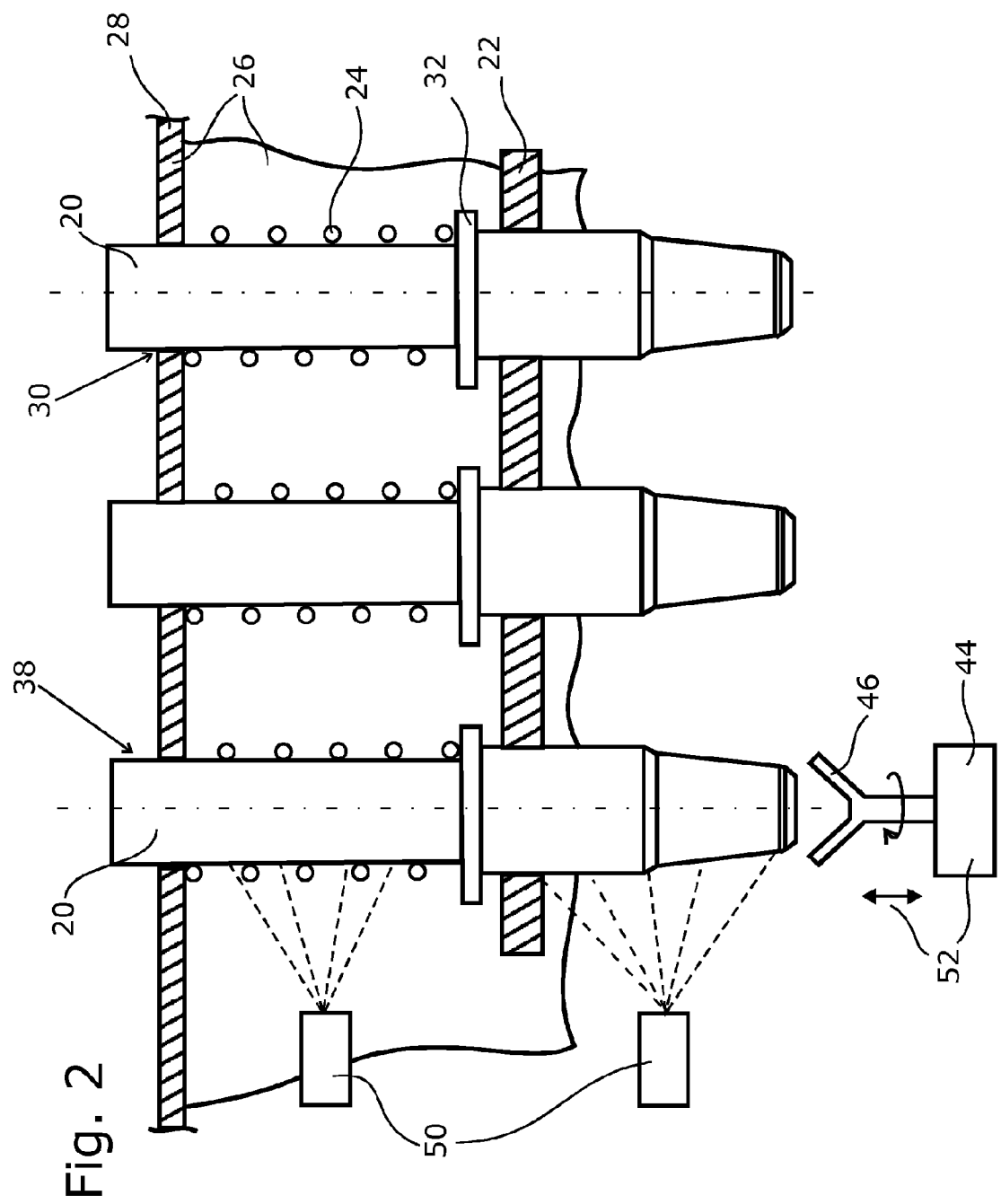
Figure 3:
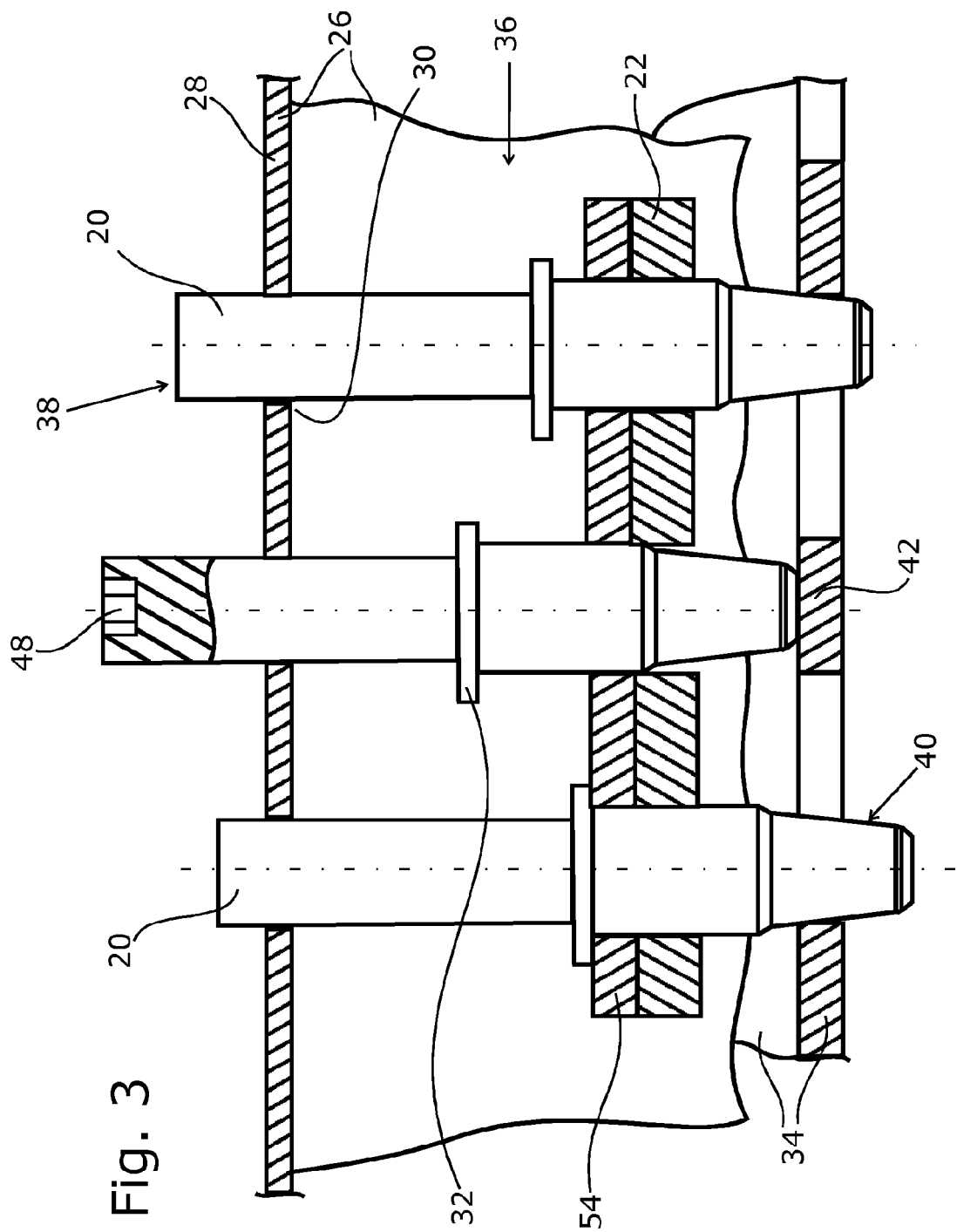
Figure 4:
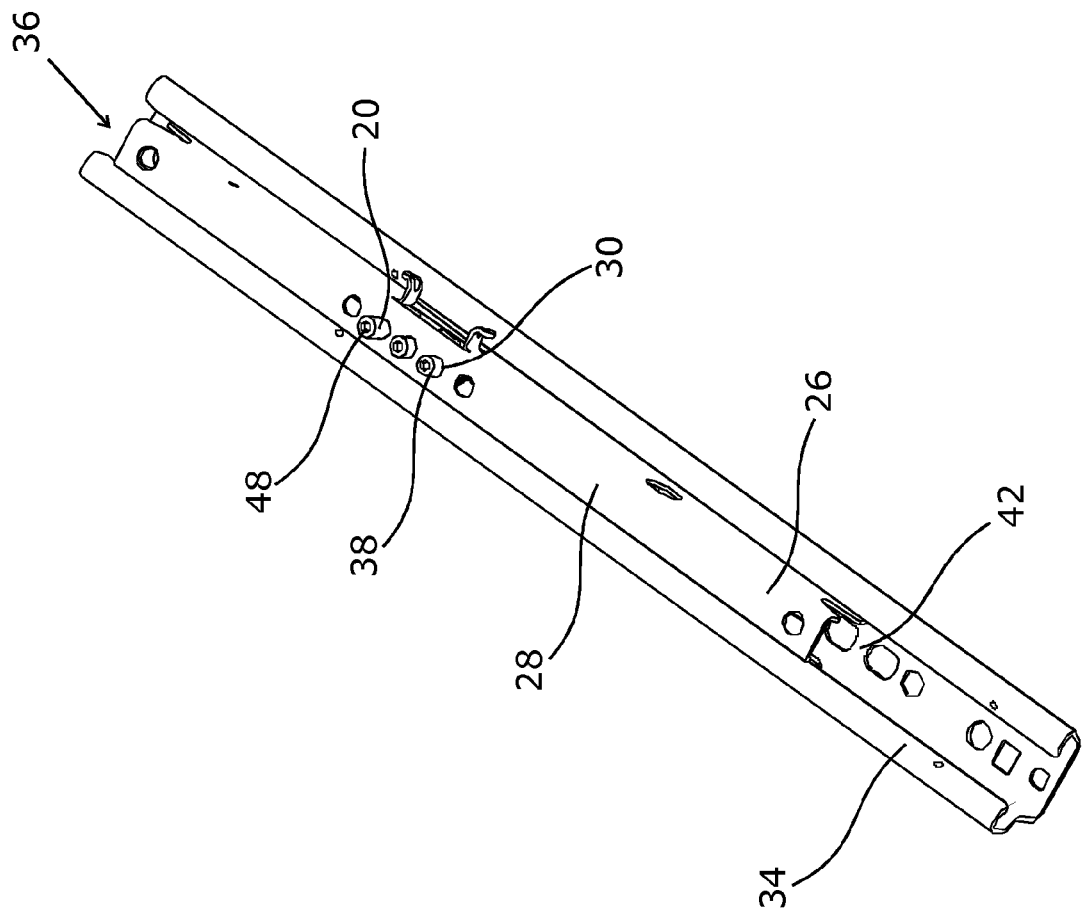
Figure 5:
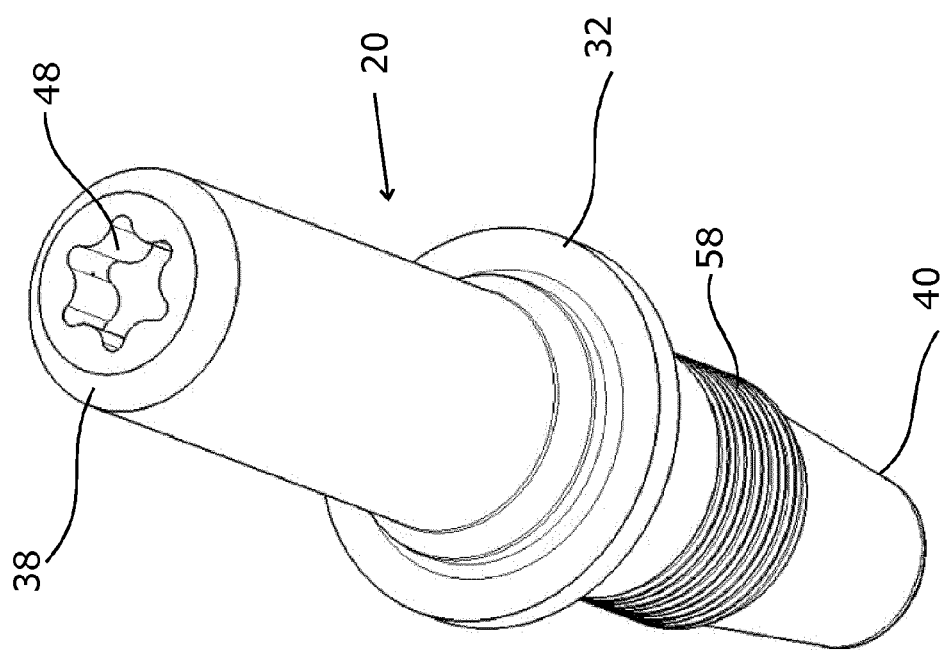

Other advantages and features of the invention become apparent from the other claims as well as from the following description of exemplary embodiments of the invention, which are to be understood not to be limiting and which will be explained in detail below with reference to the drawing. In the drawing:

FIG. 1: shows a sectional illustration of a locking unit with three locking pins, a seat rail and a guide part, without an unlocking lid, without a notched strip and without a floor rail, FIG. 2: shows an illustration of a locking unit as in FIG. 1, but for a second exemplary embodiment, FIG. 3: shows a sectional illustration of a locking unit with three locking pins, a seat rail, a floor rail including a notched strip, a guide part and an unlocking lid, FIG. 4: shows a perspective illustration of the locking unit including rails according to FIG. 3 with a view from above onto the seat rail, and FIG. 5: shows a perspective illustration of a locking pin with an oblique view from above onto an actuating end.

FIG. 1 shows a first exemplary embodiment; in the following, the method will be explained, the device will be explained and the locking device itself will also be described with reference to this exemplary embodiment. The other exemplary embodiments, i.e. the second exemplary embodiment according to FIG. 2, the third exemplary embodiment according to FIGS. 3 and 4, and the fourth exemplary embodiment according to FIG. 5 will be described thereafter; they will be explained in detail only to the extent they differ from the first embodiment.

The applicant reserves the right to combine any features and sub-features from the description, and there also from individual sentences of partial sentences, as well as from the claims, also sub-features and partial features, with one another in any way.

FIG. 1 shows an incomplete locking device; it has three locking pins 20, a guide part 22 with guide bores, with one guide bore being provided for each locking pin 20, and springs 24, with a separate spring 24 again being provided for each locking pin 20. The locking device thus described is connected to a seat rail 26. Specifically, the guide part 22 is connected, e.g. by butt welding, to a lateral flange of the seat rail 26 apparent from FIG. 1. Of the seat rail 26, an upper flange 28 is also shown; in the assembled state it extends horizontally.

There are three openings 30 located in it, with one opening 30 being again provided for each locking pin 20. The locking pins have a collar 32; with it, they rest on the surface of the guide part 22 in the depicted cross-sectional illustration according to FIG. 1. They are biased into this position by the springs 24. Each spring 24 is supported between the upper flange 28 and the collar 32 of a locking pin 20. They are helical spring designed for pressure.

Preferably, rail pairs are used in which the seat rail 26 and a floor rail 34 (see FIG. 3) delimit an elongate channel 36; see, for example, U.S. Pat. No. 5,941,495 A and U.S. Pat. No. 6,059,248 A mentioned above. The guide part 22 and the springs 24 are located in this channel 36; in addition, the predominant part of the locking pins 20 is located in the channel 36. In the rail pairs used with preference, each rail 26, 34 substantially has only a single long lateral flange; the other lateral flange is significantly shorter than the long lateral flange; see FIG. 4. The guiding means, for example balls, that are disposed between the rails 26, 34 are opposite from one another on a diagonal of the rail pair. Thus, the locking pins 20 are laterally accessible, as the FIGS. 1 to 3 show. Only the floor rail 34 covers this access.

The locking pins 20 are formed in accordance with the teaching of DE 10 2010 043 025. All of the information and disclosures contained in that patent application also apply to the present application. The locking pins 20 are round; they can thus be rotated in the guide bores without a different result. The locking pins 20 have an upper actuating end 38 which, in the exemplary embodiments shown, protrudes from the top of the seat rail 26, and a lower engagement region 40. There, the locking pin 20 tapers towards a lower end. The engagement region comes into contact with a notched strip 42; the latter is apparent from FIG. 3. The locking pins 20 rotate about their own axis.

FIG. 1 shows a rotary drive unit; it is located above the middle locking pin 20. Similar rotating devices are also provided for the other locking pins 20. The rotary drive unit comprises rotating tool 46 or bit which is rotationally driven in the direction of the peripherally extending arrow. It has a hexagonal shape. A non-circular portion 48 is formed in the actuating end 38. It is configured like in a hexagon socket screw. As regards its shape, the non-circular portion 48 fits the rotating tool 46. If the rotating tool 46 is inserted into the non-circular portion 48, the locking pin 20 can be driven. The non-circular portion can have any shape, e.g. slot, cross recess, hexagon socket, external hexagon, polygon socket, external polygon, etc.

Two spraying devices 50 are allocated to the left locking pin 20. From them, grease is applied onto the facing surface of the locking pin 20. The rotary drive unit is actuated during this application; the locking pin 20 is rotated at least once. Thus, the entire facing surface of the locking pin 20 is provided with a grease layer or lubricant layer. The engagement region 40 is also treated this way, as can be seen from FIG. 1. The spraying devices 50 are arranged in such a way, and optionally limited in their spraying action by screens, that in each case only the surfaces of the locking pin 20 to be treated are being reached. Preferably, at least one spraying device 50 is provided for each locking pin 20.

Subsequent to the above-described process step of greasing, the following step is carried out in an improvement: By means of a suitable lift drive 52, the locking pins 20 are lifted from the position shown in FIG. 1 to such an extent that the partial area of the locking pins 20 previously covered by the guide part 22 becomes visible. Then, a spraying process is carried out again with at least one rotation of the locking pin 20. Now, the spring 24 is also displaced and the regions previously covered by the spring 24 are wetted.

After the at least one step of greasing has been carried out, the assembly can be continued. Now, an unlocking lid 54 is installed, as it is apparent from FIG. 3. In addition, the floor rail 34 is installed, so that the channel 36 is now closed laterally. The floor rail 34 comprises a notched strip 42 which is formed in accordance with the prior art.

In a second exemplary embodiment according to FIG. 2, the rotary drive unit acts on the locking pin 20 not positively, but rather frictionally. Once again, the rotary movement is introduced coaxially. A cup-shaped or V-shaped part is now used as a rotating tool 46, which comes into contact with the engagement region 40. In the embodiment according to FIG. 2, the rotary drive unit is simultaneously configured as a lift drive unit 52; reference is made to the double arrow. In the state shown by FIG. 2, the lifting device has already lifted the left locking pin 20 slightly against the spring 24; this can be seen from the distance of the collar 32 from the guide part 22. Again, two spraying devices 50 are being used which spray the exposed surfaces with grease. Again, at least one complete turn is carried out. Another turn can be carried out in another axial position of the lift drive unit 52. The lift drive unit and the rotary drive unit can also be actuated together at the same time, which results in a somewhat helical application of the grease.

FIG. 3 shows a finished locking device; however, the springs 24 are not shown for the sake of simplicity. A latched state is shown, as it is typical for the locking unit. The two outer locking pins 20 each rest against a notch of the notched strip 42; the middle locking pin 20 rests on top of a notch and is passive. The unlocking lid 54 can be moved upwards to such an extent that the middle locking pin 20 is also lifted at least slightly and is freed from the notched strip 42.

In the illustration according to FIG. 4, the unlocking lid 54 has been omitted.

FIG. 5 shows a perspective view of the locking pins 20 used. They have a furrowed region 58; it is located by the locking pins 20, which are in engagement with the notched strip 42, in the region of the guide bore and preferably also protrudes downwards over the lower end of the guide bore. In the embodiment according to FIG. 5, the non-circular portion 48 is no longer hexagonal, but rather star-shaped. Any shape of the non-circular portion 48 is possible. The non-circular portion 48 can be shaped not only as an internal shape, but also as an external shape, e.g. an external hexagon. It is also possible to form other areas of the locking pin 20 as a non-circular portion 48. For example, the collar 32 can have an external gearing, like a normal gear. The rotary drive unit can act on this external gearing via the rotary drive unit; the latter has a suitable gear meshing with the collar 32. In this case, two geared collars 32 can be driven by a single gear of the rotary drive unit.

The lift drive unit 52 can also be configured as a mechanical tool, for example in the form of a fork, which reaches with its prongs between the guide part 22 and the collar 32 and which acts similar to the unlocking lid 54, which has not yet been installed.

The invention claimed is:

1. A method for producing a locking device of a longitudinal adjustment device of a vehicle seat, comprising: producing a locking device comprising several round locking pins that can be latched in independently of one another and unlatched together, at least one guide part and a notched strip, wherein the guide part is allocated to a seat rail and has guide bores for the locking pins, the notched strip is allocated to a floor rail, and the locking pins have an upper actuating end and a lower engagement region cooperating with the notched strip, and greasing the locking pins during the production step or subsequent thereto, wherein each individual locking pin is rotationally driven by a rotary drive unit one of during the greasing step, subsequent to the greasing step, or during and subsequent to the greasing step and wherein each individual locking pin is rotated within a respective one of the guide bores.

2. The method according to claim 1, wherein the rotary drive unit in each case carries out at least one complete turn of the locking pin.

3. The method according to claim 1, wherein the rotary drive unit comprises a rotating tool, and a non-circular portion cooperating with the rotating tool is provided in the actuating end of the locking pin.

4. The method according to claim 1, wherein the greasing step is carried out prior to the assembly of the floor rail.

5. The method according to claim 1, wherein the greasing step is carried out by spraying on a grease with a spraying device.

6. The method according to claim 1, wherein, in addition to the rotation of the locking pin by the rotary drive unit, an axial movement of the locking pin by a lift drive unit also takes place.

7. A device for carrying out the method according to claim 1, wherein the device comprises a rotary drive unit that comes into contact with the locking pin and sets the locking pin into rotation.

8. The device according to claim 7, wherein the rotary drive unit comprises a rotating tool, at least one locking pin comprises a non-circular portion, and the rotating tool and the non-circular portion cooperate positively.

9. The device according to claim 1, wherein the device further comprises a lifting device which moves at least one locking pin in the axial direction.

10. A locking device of a longitudinal adjustment device of a vehicle seat, comprising several round locking pins that can be latched in independently of one another and unlatched together, a guide part and a notched strip, wherein the guide part is allocated to a seat rail and has several guide bores for the locking pins, the notched strip is allocated to a floor rail, and the locking pins have an upper actuating end and a lower engagement region cooperating with the notched strip, wherein each locking pin comprises a non-circular portion cooperating with a rotating tool of a rotary drive unit, and the non-circular portion is preferably provided at an end of the locking pin.

11. The method of claim 1, further comprising inserting the locking pins into a respective one of the guide bores prior to greasing the locking pins.

\* \* \* \* \*